US007155912B2

(12) United States Patent
Enis et al.

(10) Patent No.: US 7,155,912 B2
(45) Date of Patent: Jan. 2, 2007

(54) METHOD AND APPARATUS FOR STORING AND USING ENERGY TO REDUCE THE END-USER COST OF ENERGY

(76) Inventors: Ben M. Enis, 1231 Panini Dr., Henderson, NV (US) 89052; Paul Lieberman, 19815 Mildred Ave., Torrance, CA (US) 90503-1121

( * ) Notice: Subject to any disclaimer, the term of this patent is extended or adjusted under 35 U.S.C. 154(b) by 0 days.

(21) Appl. No.: 10/973,276

(22) Filed: Oct. 27, 2004

(65) Prior Publication Data
US 2005/0138929 A1 Jun. 30, 2005

Related U.S. Application Data

(60) Provisional application No. 60/514,801, filed on Oct. 27, 2003.

(51) Int. Cl.
| | |
|---|---|
| G05D 11/00 | (2006.01) |
| F03D 9/00 | (2006.01) |
| F03D 9/02 | (2006.01) |
| F25D 3/00 | (2006.01) |
| B60K 16/00 | (2006.01) |
| F03G 6/00 | (2006.01) |
| F02C 6/00 | (2006.01) |
| F02C 6/16 | (2006.01) |
| H02P 9/00 | (2006.01) |
| G06F 19/00 | (2006.01) |

(52) U.S. Cl. ............................ 60/652; 60/398; 60/659; 290/52; 307/66; 307/67; 700/286; 700/291; 700/295; 700/296

(58) Field of Classification Search ................. 60/398, 60/641.8, 652, 659, 706; 290/43, 52, 54; 307/66, 67; 700/286, 291, 295, 296
See application file for complete search history.

(56) References Cited

U.S. PATENT DOCUMENTS 2,539,862 A 1/1951 Rushing
(Continued)

FOREIGN PATENT DOCUMENTS
JP 09317495 A * 12/1997

*Primary Examiner*—Sheldon J Richter
(74) *Attorney, Agent, or Firm*—J. John Shimazaki

(57) ABSTRACT

The invention relates to an energy storing method and apparatus for use by end-users of energy, such as commercial property owners and operators. The system differs from past systems, insofar as it is not intended to be used by and in connection with energy suppliers, such as large utility and power supply plants and grids. The system preferably relates to the manner in which an end-user of energy can implement energy and costs savings, by using energy storage and time-shifting methods, to control and regulate the consumption of energy in a manner that achieves a cost savings over a period of time. One aspect of the method relates to accurately forecasting and predicting the energy demands and peaks that might occur on a daily basis, by recording and analyzing the prior day's history, as well as the overall energy demand histories, using short and long term forecasts, and then setting up a variable energy storage/use plan or schedule that helps to reduce the peak demands by time-shifting the energy that is used, i.e., reducing consumption during high demand/high cost periods, and using the energy stored during low demand/low cost periods during the high demand/high cost periods.

20 Claims, 2 Drawing Sheets

U.S. PATENT DOCUMENTS

| | | | | |
|---|---|---|---|---|
| 3,151,250 A | * | 9/1964 | Carlson | 290/52 |
| 3,831,373 A | * | 8/1974 | Flynt | 290/52 |
| 4,206,608 A | | 6/1980 | Bell | |
| 4,229,661 A | * | 10/1980 | Mead et al. | 290/52 |
| 4,353,214 A | * | 10/1982 | Gardner | 60/652 |
| 4,510,756 A | * | 4/1985 | Hise et al. | 60/659 |
| 4,849,648 A | * | 7/1989 | Longardner | 290/54 |
| 5,448,889 A | * | 9/1995 | Bronicki | 60/652 |
| 5,517,424 A | * | 5/1996 | Marcelle et al. | 290/52 |
| 5,537,822 A | * | 7/1996 | Shnaid et al. | 60/659 |
| 5,685,155 A | * | 11/1997 | Brown et al. | 60/652 |
| 5,778,675 A | * | 7/1998 | Nakhamkin | 60/652 |
| 5,924,283 A | * | 7/1999 | Burke, Jr. | 60/398 |
| 5,969,435 A | * | 10/1999 | Wilhelm | 307/66 |
| 6,094,926 A | * | 8/2000 | Nakayama et al. | 62/430 |
| 6,305,158 B1 | * | 10/2001 | Nakhamkin et al. | 60/726 |
| 6,522,031 B1 | * | 2/2003 | Provanzana et al. | 307/64 |
| 6,581,394 B1 | * | 6/2003 | Smolenskiy | 62/402 |
| 6,885,115 B1 | * | 4/2005 | Hatori et al. | 307/66 |
| 6,900,556 B1 | * | 5/2005 | Provanzana et al. | 307/66 |

* cited by examiner

METHOD AND APPARATUS FOR STORING AND USING ENERGY TO REDUCE THE END-USER COST OF ENERGY

RELATED APPLICATION

This application claims the benefit of the filing date of U.S. Provisional Application Ser. No. 60/514,801, entitled "Method And Apparatus For Storing And Using Energy", filed on Oct. 27, 2003.

FIELD OF THE INVENTION

The present invention relates to the field of energy storage systems.

BACKGROUND OF THE INVENTION

There are literally hundreds of thousands of office buildings and other commercial property located in the United States and throughout the world (hereinafter "commercial properties"). And, because most businesses and commercial properties are required to operate during the day, they typically need substantial electrical energy during the daytime hours to provide power for utilities, including lighting, heating, cooling, etc. This is particularly true with heating and cooling requirements, such as during the extreme winter and extreme summer months, wherein the energy needed to maintain a comfortable work environment can be relatively high.

These peak demands can place a; heavy burden on utility plants and grids that supply electrical power to commercial properties. Utility plants and grids often have to be constructed to meet the highest demand periods, which means that during the low demand periods, they will inevitably operate inefficiently, i.e., at less than peak efficiency and performance. This may be true even if the peak demand periods occur during only a small fraction of the time each day. Failure to properly account for such high demand periods, such as by over-designing the facilities to meet the peak demands, can result in the occurrence of frequent power outages and failures. Also, a failure in one area of the grid can cause tremendous stress and strain in other areas, wherein the entire system can fail, i.e., an entire regional blackout can occur.

These demands can also place expensive burdens on commercial property owners and operators. Utility companies often charge a significant premium on energy consumed by commercial properties during peak demand hours. This practice is generally based on the well known principles of supply and demand, e.g., energy costs are higher when demand is high, and less when demand is low. And because most commercial property owners are forced to operate during the day, they are most often forced to pay the highest energy costs during the highest demand periods.

Utility companies also charge for energy during peak demand periods by assessing a penalty or surcharge (hereinafter "demand charge") on the maximum rate of consumption that occurs during a predetermined period, such as a one month period. A demand charge may be assessed, for example, based on the maximum "peak" rate of consumption that occurs during the period, wherein the demand charge can be assessed regardless of how short the peak "spike" or "surge" during that period is, and regardless of what rate may have applied immediately before and after the spike or surge. This demand charge can also be assessed regardless of the average consumption rate that may have otherwise been in effect during the period, which could be considerably lower than the peak. Even if the overall average rate of use is substantially lower, the demand charge can be based on a much higher peak spike or surge experienced during that period.

These pricing practices are designed to help utility companies offset and/or recover the high cost of constructing utility power plants and grids that are, as discussed above, designed to meet the peak demand periods. They also encourage commercial property owners and operators to reduce energy consumption during peak periods, as well as to try to find alternative sources of energy, if possible. Nevertheless, since most commercial property owners and operators must operate their businesses during the day, and alternative sources of energy are not always readily available, they often find themselves having to use energy during the highest rate periods. Moreover, because energy consumption rates can fluctuate, and surges and spikes can occur at various times, potentially huge demand charges may be applied.

Utility companies and other providers of energy have, in the past, implemented certain time-shifting methods, wherein energy supplied during low demand periods are stored, and then used later during peak demand periods. These methods typically involve storing energy, and then using that energy later, to supplement the energy provided by the grid. This theoretically enables more energy to be consumed when energy costs are low, and less energy to be consumed when energy costs are relatively high, thereby potentially reducing the higher rate costs.

Several such energy storage methods have been used in the past, including compressed air energy storage systems, such as underground caverns. Thus far, however, one of the main disadvantages of such systems is that they are relatively energy inefficient. For example, compressed air energy systems have a tendency to lose a significant portion of the energy that is stored, so that the energy used from storage ends up actually costing more than the energy that was stored. These inefficiencies can make it so that the economic incentives to install energy storage systems of this kind are significantly reduced.

Even though there are some advantages to such energy storage systems, the added costs associated with installing and operating such systems can become a financial burden, especially at the end-user level. Accordingly, commercial property owners and operators that use energy often have difficulty justifying the cost of installing and using such systems. Moreover, because of the expense of installation, they may have difficulties obtaining financing and approval, e.g., to attract investors and/or lenders to spend the money needed to develop and install such a system, because they often doubt whether they will be able to recoup the costs.

A method and system is needed, therefore, that can be used by individual end-users of energy or commercial property owners and operators to control and regulate the end-user consumption of energy from the power grid, so that more energy can be consumed during low-cost, low-demand periods, and less energy can be consumed during high-cost, high-demand periods, to achieve not only a reduction in overall demand and reducing the spikes and surges that can occur during peak demand periods, but to reduce the overall stress and strain on the power grid, and provide a means of forecasting the cost savings that can be achieved over an extended period of time, which can justify the cost and expense of installing and operating the system, thereby making the system more widely used.

SUMMARY OF THE INVENTION

The present invention relates to a method and energy storage system capable of being used by commercial property owners and operators for storing energy during periods when energy costs are relatively low, and then using the stored energy during periods when energy costs are relatively high, to reduce reliance on the power grid during the high demand periods, and therefore, reduce the operating costs associated therewith, and to do so in a manner that helps obtain a cost savings over an extended period of time.

The present invention is preferably to be used by commercial property owners and operators, such as office buildings, shopping centers, and other end-users of energy, and in this respect, the present system differs from past systems, insofar as it is not intended to be used by and in connection with energy suppliers, such as large utility and power supply plants and grids. That is, the present system preferably relates to the manner in which an "end-user" of energy can implement energy and costs savings, by using energy storage and time-shifting methods, to control and regulate the consumption of energy in a manner that achieves a cost savings over an extended period of time. This cost saving method is referred to as "Time-Of-Use" or TOU.

In this respect, one aspect of the present method and system preferably relates to being able to accurately forecast and predict the energy demands and peaks that might occur on a daily basis, by recording and analyzing the prior day's history, as well as the overall energy demand histories, using short and long term forecasts, and then setting up a variable energy storage/use plan or schedule that helps to reduce the peak demands by time-shifting the energy that is used, i.e., reducing consumption during high demand/high cost periods, by using the energy stored during low demand/low cost periods during the high demand/high cost periods.

DETAILED DESCRIPTION OF THE INVENTION

This discussion will begin by discussing some of the basic components of the energy storage system apparatus that can be used by the present invention. The invention contemplates that various energy storage systems can be used in connection with the methods discussed herein. Nevertheless, the following discussion describes a preferred system that can be used in connection with the present invention.

The system generally comprises a compressed air energy storage system small enough to be housed within a commercial property, whether an office building, shopping center, or other end-user of energy. For example, the system can be installed in a basement of an office building, shopping center or commercial complex, where other utility equipment might be located. The storage tank can also be located on the roof or other outdoor location, and, for example, painted black, to enable the tank to absorb heat energy from the sun, as will be discussed.

Figure 1:
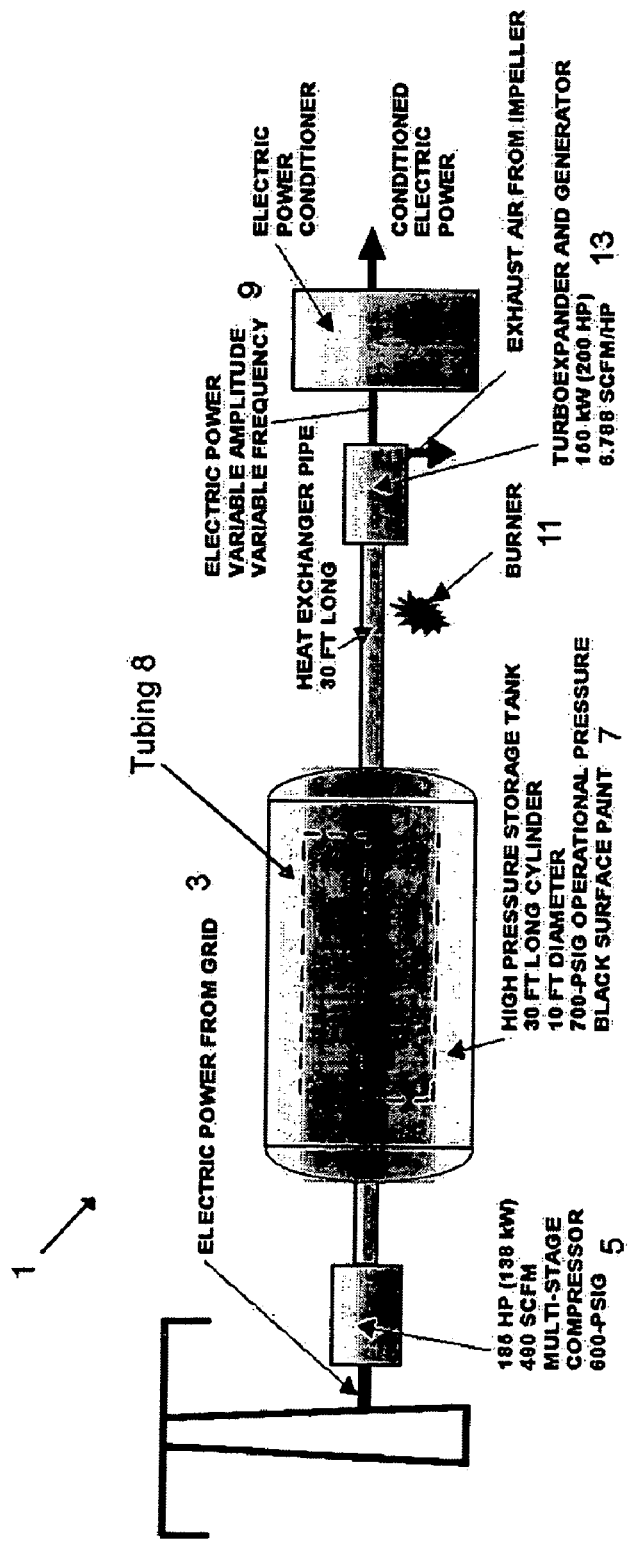
FIG. 1 shows a typical energy storage system to be used in the present application.

As shown in FIG. 1, the system 1 is preferably connected directly to the power grid 3. This enables the system to draw power from the grid 3 in the same manner as any other commercial property. The difference, however, is in how the system can control and regulate the consumption of energy, as will be discussed.

Storage system 1 preferably comprises components found in energy storage systems of this kind, including a compressor 5, a storage tank 7, an airflow control valve 9, a turbo-expander 11, an electrical generator 13, etc. The compressor 5 is preferably connected to the power supply so that electrical energy from the grid 3 can be converted to compressed air energy during off-peak, low demand hours, such as during the nighttime hours. The compressor 5 preferably uses electrical energy from the grid 3 and compresses air into the storage tank 7, wherein the compressed air is stored until it can be used later when energy demands and costs are relatively high.

In general, the energy storage portion of the present system preferably comprises means for storing and making use of the compressed air energy. In this respect, storage tank 7 is preferably designed to withstand the pressures likely to be applied by compressor 5, and insulated to maintain existing temperatures in tank 7. Tank 7 is also preferably located in proximity to where the system 1 is connected to the power grid 3, such that compressed air can be conveyed to tank 7 without significant pressure losses.

Although the present invention contemplates that various size tanks can be used, the size of the storage tank 7 depends on the amount of compressed air energy required for a given application, as well as other factors, such as the capacity of the compressor 5, the capacity of the turbo-expander 11, amount of the expected energy demand at the location, the size of the available space, etc.

The present invention contemplates that any of many conventional means of converting the compressed air into electrical energy can be used. In one embodiment, one or more turbo-expanders 11 are used to release the compressed air from storage tank 7 to create a high velocity airflow that can be used to power a generator 13 to create electrical energy. This electricity can then be used to supplement the energy supplied by the grid 3 when needed, as will be discussed. The turbo-expander 11 preferably feeds energy to an alternator, which is connected to an AC to DC converter, followed by a DC to AC inverter.

The turbo-expander 11 is used to release and expand the compressed air energy at the appropriate time, i.e., "on demand," such as during peak demand periods, wherein the released and expanded air can drive the electrical generator 13. This way, the stored energy in the tank can be used to generate electrical power on an "as needed" basis. For example, the turbo-expander 11 can be turned on when demand is low and there an expectation that extra energy will be needed during an upcoming high demand period, based on the monitored demand power history, as will be discussed below. On the other hand, the turbo-expander 11 can be shut down during the relatively high demand, high cost periods, so that high cost energy is not used to compress air into the tank 7. The criteria preferably takes into account that the turbo-expander 11 starts from rest and accelerates to a peak rotational rate and then decelerates back to rest.

The present invention contemplates that storage tank 7 and/or related components, and their thermal inertia masses, can be designed to absorb and release heat to maintain the stored and compressed air in the tank 7 at a relatively stable temperature, even during compression and expansion. For example, in one embodiment, a heat transfer system made of tubing 8 extended through the inside of storage tank 7 can be used, wherein heat transfer fluid (such as an antifreeze) can be distributed through the tubing 8 to provide a cost-efficient way to stabilize the temperature in the tank 7. This enables the system 1 to statically stabilize the temperature in a manner that is more cost efficient than mechanical systems.

In this embodiment, the means by which heat from various collectors (to be discussed) can be distributed to the compressed air in the tank 7 comprises a large surface area of thin walled tubing 8 that extends through tank 7. The tubing 8 preferably comprises approximately 1% of the total area inside the tank 7, and preferably comprises copper or carbon steel material. They also preferably contain an anti-freeze fluid that can be heated by the collectors and distributed by the tubing 8 throughout the inside of tank 7. The thin walled tubing 8 preferably act as a heat exchanger, which is part of the thermal inertia system. The tank 7 is preferably lined by insulation 19 to prevent heat loss from inside.

In another embodiment, the relatively thick walls of the storage tank 7 can, by itself, act as a thermal sink and source. For example, when air is compressed into storage tank 7, and the air is heated, this heated air can help raise the temperature of the storage tank walls, i.e., the walls absorb the heat. Furthermore, when tank 7 is located outdoors, and painted black, the walls of the tank can absorb the heat from the sun, wherein the tank walls can act as a heat sink.

Extra metal, in such case, can be added to the walls, so that they provide a similar thermal inertia function as the anti-freeze filled tubing 8, but with the added safety of being able to retain the storage tank 7 service-free for longer periods of time, i.e., considering the long term effects of corrosion. Moreover, a reduced number of problems can be expected, such as from corrosion, since the air inside the tank cannot contain a significant amount of water vapor at higher pressures. In this respect, compressor 5 will help to remove most of the water vapor during air compression, and the water condensed in tank 7 is preferably drained each day, i.e., such as by a draining means, wherein the air in storage tank 7 can be extremely dry.

The mass of the tank 7 can also be made relatively large compared to the air mass inside the tank 7. Accordingly, the tank walls do not have to increase in temperature by a significant amount to help sustain the temperature of the air inside the tank 7. For example, when air is exhausted by the turbo-expander 11, the air temperature in the tank 7 will try to drop according to isentropic laws, but a heat exchange process will occur as a result of the heat absorbed by tank walls, which act as a thermal source to maintain the temperature in the tank 7. Thus, the temperature drop is limited so that reasonable air temperatures are available inside the tank 7, i.e., for use by turbo-expander 11.

Figure 2:
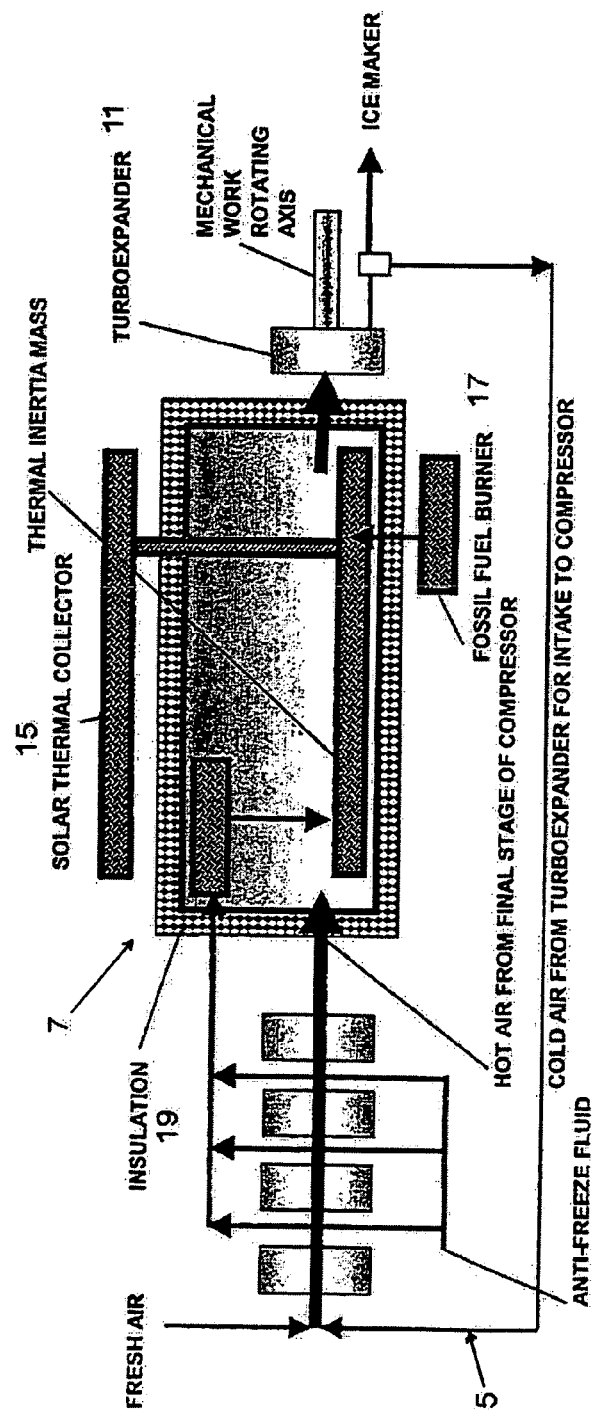
FIG. 2 shows a typical storage tank system with optional heating devices.

The present system can also incorporate other energy efficient methods and systems, as shown in FIG. 2, including a means of using the heat absorbed in the interstage coolant water of the multi-stage compressor to provide supplemental heat for water heaters and boilers and other areas of the building or property, so that the heat can be put to efficient use. Also, the present invention contemplates the possibility of using one or more of a combination of solar heat (using a solar thermal collector 15), waste heat from the compressor 5, combustors, low-level fossil fuel power 17, etc., to provide the necessary heat to increase the temperature and pressure in the storage tank 7. In this respect, the heat generated by compressor 5 can be used to maintain the stability of the temperature in tank 7, to offset the cooling effect of the turbo-expander 11, as it releases and expands air from the tank 7.

For example, the storage tank 7 is preferably very effective in using the waste heat that needs to be removed from ammonia-refrigerated plants. For example, whenever the storage tank temperature drops to below 120 degrees F., the hot ammonia from the refrigeration cycle of the plant can flow through the tubing 8 in tank 7. In this respect, it should be noted that turbo-expander 11 not only depends on the air supply pressure, but the higher the air supply temperature, the greater the energy produced by the turbo-expander 11.

The increased temperature inside the storage tank 7 provides several advantages. First, it has been found that heat contributes greatly to the efficiency of overall work performed by the turbo-expander 11, and therefore, by increasing the temperature of the compressed air in the storage tank 7, a greater amount of energy can be generated from the same size storage tank. Second, by increasing the temperature of the air in the storage tank 7, the pressure inside the tank can be increased, wherein a greater velocity can be generated through the turbo-expander 11. Third, heating the air in the tank 7 helps to avoid freezing that can otherwise be caused by the expansion of the air in the tank 7. Without a heating element, the temperature of the air released from the tank 7 can reach near cryogenic levels, wherein water vapor and carbon dioxide gas within the tank 7 can freeze and reduce the efficiency of the system. The present invention is preferably able to maintain the temperature of the expanding air at an acceptable level, to help maintain the operating efficiency of the system.

Likewise, the cooling effect resulting from the turbo-expander 11 expanding the compressed air can be used to supplement air conditioners and other cooling systems within the building or property. The present system contemplates that the cold air created by the expansion of the compressed air exhausting from the turbo-expander 11 can be used for additional refrigeration purposes, i.e., for cooling needed to keep refrigerators and freezers cold, as well as during the summer months to supplement energy needed to run air conditioners. This way, the system can be used to supplement the existing energy systems that are already in place within the commercial property. The cold air can also be rerouted through pipes to the compressor 5 to keep the compressor cool, as shown in FIG. 2.

The system also preferably comprises a control system to control the operation of storage tank 7, compressor 5, turbo expander 11, heating units, refrigeration components, etc. The control system is preferably designed to be able to maintain the level of compressed air energy in the tank 7 at an appropriate level, by regulating the flow of compressed air into and out of tank 7. The controls are also used to control and operate the heat exchangers that are used to help control the temperature of the air in the tank 7. The controls determine which heat exchangers are to be used at any given time, and how much heat they should provide to the compressed air. The control system preferably has a microprocessor that is pre-programmed so that the system can be run automatically. The control system preferably enables the user to determine when to use the compressed air energy.

The invention also preferably comprises a computer operated control system to help control and regulate the consumption of energy from the grid, to enable the system to decrease consumption during high demand periods, and, in turn, increase consumption during low demand periods, and to do so in a manner that enables the system to achieve a cost savings over an extended period of time. On a micro-level, the present system preferably enables the commercial property owner or operator to experience an energy cost savings, by consuming more energy during low cost periods, and less energy during high cost periods, and by reducing the occurrence of spikes and surges that can otherwise result in significant demand charges being assessed. The methods and systems contemplated by the present invention also make it possible, at a macro-level, to reduce the overall demand placed on utility plants and grids, such as during peak demand periods, which can help reduce the overall stress and strain on the grid, and thereby help reduce the likelihood that blackouts and other failures to the entire system could occur in the future.

The unique methods applied by the present system involve the following:

The initial steps preferably involve doing some research to determine the costs involved in installing and operating different size and capacity storage systems. Once these amounts are determined, the method contemplates using the information to determine what the rate of cost savings will have to be for the system to achieve an overall cost savings over the course of a predetermined time period, such as by the end of the depreciation cycle. That is, the method contemplates using a process to determine, for any given system, what the rate of cost savings will have to be, i.e., on a daily basis, to achieve an overall cost savings over an extended period of time, such as ten or fifteen years.

Based on the size and nature of the end-user property, the owner or operator may make several selections regarding what system components to use. The selection of such systems may be based on many factors, including but not limited to, the overall amount of energy to be consumed by the commercial property, what the maximum or peak demand for energy is expected to be, the expected growth and/or modifications that might have to be made to the property, where the system will be located, how much space there is to install the storage tank 7, etc. Upon determining these amounts, or making these selections, the method preferably contemplates calculating and estimating the total cost of installation and operation over the estimated depreciation cycle. For example, the total cost over a ten-year period for one system might be $600,000.00.

Once that amount is known, the method preferably involves selecting the most energy and cost efficient system to use, based on a comparison between its cost and the ability to produce an adequate rate of cost savings over time, to off-set the installation and operation costs associated therewith.

To do so, the next step preferably involves determining how much energy is typically used by the end-user, such as over the course of a given 24-hour period, and to make this determination every day over the course of the year. This preferably involves measuring energy consumption rates at the property for the previous 24 hour or longer period, and charting that data to track energy consumption levels throughout the day and night, and to use that data to chart a curve that shows how much energy might be expected to be used during the next upcoming 24 hour period. The curve also preferably includes an estimate of the spikes and surges that might occur during that day or period, including the size of the spikes and surges, when they might occur, and how long they might last.

The method also preferably involves taking data over the course of several days, weeks, or months, etc., i.e., during the course of several seasons, if necessary, to determine whether there are significant changes in energy consumption that might occur from one season of the year to another. By looking for patterns during different times of the year, system operators can use this information to help forecast and predict when significant changes in energy consumption might occur, which can be used to more accurately forecast and predict when consumption rates might increase or when spikes and surges might occur.

In this respect, the method contemplates that the curve can be adjusted if necessary, based on the historical data for that period of the year, wherein the system can take into account the short and long-term data to determine the nature of the curves that are developed. This helps to ensure that the short-term analysis of the data is consistent with the long-term analysis for that particular property during that particular time of year.

The information obtained by these processes can then be used to accurately forecast and predict the expected consumption rate by the end-user during any given 24 hour period, during any given time of day. That is, for any given 24 hour period, the method contemplates using the data from the previous 24 hour period, as well as other historical data, to forecast and predict how much energy might be expected to be used on that day and when.

The present method contemplates using these forecasts and predictions to know in advance when the consumption rate will likely be at its highest, and to attempt to predict when and how long the spikes and surges might be, so that the proper controls and limitations can be implemented to time-shift energy consumption away from the peak demand periods, i.e., by storing energy during the low demand periods, and using the stored energy during the high consumption rate periods, and/or whenever spikes and surges might occur. This way, the amount of energy consumption during the highest rate periods, and the level of spikes and surges that might otherwise occur, can be reduced to reduce the energy costs that might apply during that period.

The system contemplates making these predictions and forecasts in conjunction with the actual energy rates and demand charges that are assessed by the utility power plants. That is, the method contemplates that by knowing the end-user's expected consumption rate, and knowing what the actual cost of energy will be during that same period, an evaluation can be made as to how the system can be adjusted and controlled to maximize the cost savings that can be achieved. In short, the information is used to know when and how much energy should be stored during the low demand periods, and when and how much energy should be used during the higher demand periods, and to make this determination on a daily basis throughout the year.

In many cases, energy pricing schedules are typically broken down into three periods each day, based on the level of demand,. i.e., high demand, mid demand, and low demand periods. A schedule that involves three different rates, for example, is often used by utility plants, as follows: a first mid-cost, mid demand rate might apply, for example, between 8:00 a.m. and noon, a high-cost, high demand rate might apply between noon and 6 p.m., a second mid-cost, mid demand rate might apply again 11:00 p.m. and 8:00 a.m. In this respect, utility companies typically have a graduated pricing schedule that applies a different rate per kW-H for energy consumed during different times of the day.

Utility companies also typically assess "demand charges," as defined above, based on the peak "spike or surge" demand energy consumption rate experienced during any predetermined period of time, such as a one-month period. For example, in some areas of the country, in addition to the graduated pricing schedule discussed above, a utility company may charge an additional penalty or surcharge based on the maximum peak consumption of kW's experienced during that period. That is, a penalty or surcharge may be assessed for the period, based on a single maximum rate of consumption that occurs during that period, even if that single maximum peak rate lasts for only a few minutes. This demand charge is typically assessed regardless of how low the rate is immediately before and after the peak, and regardless of the average consumption rate experienced during the period. That is, the penalty or surcharge is assessed based on the peak demand consumption rate, even if the peak is a random spike or surge lasting only a few minutes, and even if that peak does not reflect the average consumption rate experienced during the remainder of the period.

Moreover, in many situations, the amount of the demand charge is highest during the peak summer months when energy consumption due to air conditioning needs are at their highest. This is particularly true within the warmer climate areas where the demand for air conditioning is extremely high. And, during those months, the price of energy is highest during the mid-day hours, which represents the highest demand period. For example, during the summer months, a typical demand charge that may be applied to a period may be $20.00 per kW based on a single peak spike rate experienced during that period, i.e., between noon and 6:00 p.m. On the other hand, only $2.45 per kW may apply during the mid-demand period, and $0.00 during the low demand period. Thus, even if the average rate during any given day of the peak summer month is relatively low (say 300 kW), if there is a single fifteen minute spike or surge during that month (i.e., at a rate of say, 700 kW), the amount of the demand charge that may be assessed for that month could be based on the higher rate (of 700 kW), and not the lower rate (of 300 kW), even though the higher rate was experienced during only a fifteen minute spike. Therefore, during peak hours, the amount of the demand charge can be prohibitively high, wherein it can be based on a single surge or spike, no matter how random, or how brief, it might be.

An example of a typical demand charge in such circumstances might be something like this: During the hottest summer months, i.e., the four hottest months, in addition to the usage rates discussed above, an additional one time demand charge may be assessed based on the maximum peak usage that occurs during that month. In the above example, the higher demand charge rate of $20.00 per kW might be applied to the highest rate spike or surge that occurs during the month, so that if the highest spike or surge is 700 kW, the higher rate will be multiplied by 700 kW, for a total demand charge of $14,000.00 for that month. On the other hand, when no spikes or surges occur during the month, or the spike or surge is lower, i.e., say 400 kW, the demand charge would be based on the lower rate, i.e., 400 kW instead of 700 kW. In such case, when multiplying $20.00 times 400 kW, the demand charge would be only $8,000.00, which would, in this example, represent a cost savings of $6,000 per month.

What this shows is that there are significant cost advantages that can be achieved by reducing or altogether eliminating the spikes and surges that can result in significant demand charges being assessed. When energy is used during the higher cost, high demand periods, the end-users are likely to be charged a significant demand charge, which means that the more the end-user uses energy during those periods, the greater the overall energy costs will be.

The way the present method addresses these additional costs, penalties and surcharges, is shown by the following example:

Based on the daily forecasts and predictions discussed above, the system determines each day how much energy is likely to be needed in storage for the upcoming 24 hour period. For example, during the summer months, because demand may be high, the system may need to store the maximum amount possible during the low demand periods, such as between 11:00 p.m. and 8:00 a.m. that morning. This additional energy can then be used during the high demand periods, to control and limit the maximum consumption rates, as well as the spikes and surges that may otherwise be experienced, and therefore, reduce the costs associated with the high demand rates.

The plan preferably calls for reserving the stored energy each day for the upcoming high demand periods for the next day, although in some cases, there may be a desire to reserve some of the energy for the upcoming mid-demand periods as well. This will depend on whether there is enough energy in storage to sufficiently control the consumption rate during the peak demand periods, and/or whether there is any excess energy available, and how much benefit there would be in applying the energy to the mid-demand periods.

Note that if the electrical power rates during the day are sufficiently high compared to the nights during the critical summer months, there may be an additional mode of operation. For example, one can use a lull in the power usage during the course of the day and actually use power to drive the compressor to further compress air into the storage tank. Thus, if there is a late afternoon surge in demand, one could defeat that spike in demand power without having to fear that the storage tank will be exhausted from excessive previous excitation of the turbo-expander. Even though there is use of daytime energy at off-peak power, it may still be economical to follow this mode of operation in order to avoid a subsequent critical spike. Daytime operation of the compressor during low power periods can be the equivalent to having a larger storage tank.

Once the appropriate amount of energy is in storage, the system waits for the higher demand periods to occur the next day, and saves the energy so that it can be released at the appropriate time. In this respect, the system preferably has a consumption meter or other indicator that instantly measures the consumption rate that might occur at any given moment in time, so that the system will know when the energy in storage should be released and how much should be released at the appropriate time, i.e., to off-set the higher consumption rates and/or spikes and surges that may otherwise occur during that day.

For example, if the forecast predicts that there will be a surge lasting for five minutes during the peak demand period, and/or several spikes lasting three minutes each, and the predicted amount of the surge and/or spike is say, 800 kW, the system will reserve an amount in storage sufficient to reduce the draw of power on the grid during that time to a predetermined threshold amount, which can be, say 400 kW. This way, for that day, the highest consumption rate that occurs can be reduced from 800 kW, which would have occurred without the present system, to 400 kW, which can result in a significant reduction in the demand charge applied. In this example, if the peak spikes and surges are reduced to 400 kW or less each day during the month, there will be a total reduction of 400 kW or more that month, i.e., for purposes of determining the demand charge, in which case a cost savings of $8,000.00 can be obtained for that month. This is based on $20.00 per kW multiplied by the difference of 400 kW. Also, it can be seen that if this is repeated everyday of the month, during the four high demand months, there could potentially be a cost savings of $8,000.00 every month, which can lead to a cost-savings of 32,000.00 e very year, which can lead to a cost savings of $320,000.00 over the course of ten years.

Additional energy saved each day can also be released during the peak demand periods to reduce the total consumption of energy experienced during that day and therefore reduce the overall usage costs that day. For example, if the rate is $0.20 per kW-H during the high demand period, $0.10 per kW-H during the mid-demand period, and $0.08 per kW-H during the low demand period, by time-shifting the energy from $0.20 per kW-H to $0.08 per kW-H, a potential cost savings based on the difference between the two rates can be achieved. Nevertheless, since there is a reduced efficiency associated with energy storage, the cost savings that can actually be achieved by time shifting to the low demand period is not as large as it could be. That is, even if all the energy used during the peak demand period could be purchased at the lower rate of $0.08 per kW-H, instead of the higher rate of $0.20 per kW-H, because of the potential reduced efficiency of potentially as much as 50% resulting from energy storage, the actual cost savings may only be $0.04 per kW-H, instead of $0.12 per kW-H. Of course, these cost savings will vary depending on the actual efficiency of the system being used. The system is preferably designed to be as efficient as possible, using the various heating devices and collectors discussed above, wherein an efficiency percentage of about 70% could potentially be obtained.

The cost savings associated with this aspect of the invention can be based on the cost savings per kW-H multiplied by the total kW-h expended by the system during the entire year, which can be significant. For example, if the system expends 2,000,000 kW-H per year during the peak demand periods, the cost savings can potentially be 2,000,000 kW-H multiplied by the difference in the per kW-H rate of $0.04 kW-H, which in the above example, may lead to an additional cost savings $80,000.00 per year (2,000,000 times $0.04 kW-H per year). Thus, it can be seen that this can lead to an additional cost savings of $800,000.00 over the course of ten years.

Using the above examples, it can be seen that a potential cost savings of $1,120,000.00 can be achieved over a ten-year period ($320,000 plus $800,000). And as storage efficiencies are improved by using the heating devices and collectors described above, these amounts could potentially be increased. Accordingly, if the cost of installing and operating the system over the same period is $600,000.00, there is potentially a net savings of $520,000.00, which would justify the cost of installing and operating the system.

U.S. application Ser. No. 10/263,848, filed Oct. 4, 2002, and U.S. Provisional Application Ser. Nos. 60/474,551, filed May 3, 2003, and 60/478,220, filed Jun. 13, 2003, are incorporated herein by reference in their entirety.

What is claimed is:

1. A method of reducing the end-user cost of energy at a predetermined location, comprising:
   providing an energy storage system comprising at least one tank and compressor capable of storing energy in the form of compressed air energy;
   locating said system at an end-user site, wherein said end-user is a consumer of energy rather than a supplier;
   forecasting how much energy will be used at said site during a second period of time, during which the energy cost is at a relatively high second rate;
   determining the nature and extent of the peak power surges and/or spikes that are expected to occur at said site during said second period of time;
   storing in said tank a predetermined amount of compressed air energy from an energy source during a first period of time, during which the energy cost is at a relatively low first rate, wherein said first period of time is prior to said second period of time; and
   using the compressed air energy from said tank in a manner that helps offset the amount of energy used at said site during said second period of time, and offset the peak power surges and/or spikes occurring at said site during said second period of time, such that the surges and/or spikes are substantially reduced or eliminated.

2. The method of claim 1, wherein the energy source is a power grid connected to the system that can be accessed to supply energy into storage.

3. The method of claim 1, wherein said site is a commercial property, and wherein the storage system is used to lower the overall cost of energy at said commercial property.

4. The method of claim 1, wherein the energy storage system comprises at least one device taken from the group consisting of:
   a. a solar thermal collector;
   b. thermal inertia mass;
   c. thin walled tubing with anti-freeze distributed inside the tank;
   d. fossil fuel burner;
   e circulation device for using hot air from the compressor.

5. The method of claim 1, wherein the method comprises developing an energy usage schedule for the second period of time to determine how the energy from storage should be used during said second period of time.

6. The method of claim 5, wherein the method comprises determining the amount of a demand charge that may be applied at said site based on the spikes and/or surges that may occur during said second period of time, and developing the energy usage schedule to reduce and/or offset the spikes and/or surges.

7. The method of claim 1, wherein the energy storage system comprises at least one turbo-expander and generator to release the compressed air energy and generate electricity during said second period of time.

8. The method of claim 7, wherein the energy storage system is adapted to use cold air from the turbo-expander for cooling and/or refrigeration purposes at said site.

9. The method of claim 1, wherein the energy storage system comprises an indicator for measuring the energy consumption rate at said site to determine how much energy in storage should be released at any given moment in time to off-set the peak power spikes and/or surges that can occur at said site.

10. The method of claim 9, wherein the indicator is a consumption meter that can determine how much energy in storage should be released at any given moment in time.

11. A method of reducing the end-user cost of energy at a predetermined location, comprising:
   providing an energy storage system comprising at least one tank and compressor capable of storing energy in the form of compressed air energy;
   locating said system at an end-user site, wherein said end-user is a consumer of energy rather than a supplier;
   determining the nature and extent of the peak power surges and/or spikes that are expected to occur at said site during a second period of time, during which demand charges are assessed based on the level of said peak power surges and/or spikes;
   storing in said tank a predetermined amount of compressed air energy from an energy source during a first period of time, during which the energy cost is lower than during said second period of time, wherein said first period of time is prior to said second period of time; and using the compressed air energy from said tank in a manner that offsets the peak power surges and/or spikes occurring at said site during said second period of time, such that said peak power surges and/or spikes are substantially reduced or eliminated.

12. The method of claim 11, wherein the energy source is a power grid connected to the system that can be accessed to supply energy into storage.

13. The method of claim 11, wherein said site is a commercial property, and wherein the storage system is used to lower the overall cost of energy at said commercial property.

14. The method of claim 11, wherein the energy storage system comprises at least one turbo-expander and generator to release the compressed air energy and generate electricity during said second period of time.

15. The method of claim 11, wherein the energy storage system comprises at least one device taken from the group consisting of:
  a. a solar thermal collector;
  b. thermal inertia mass;
  c. thin walled tubing with anti-freeze distributed inside the tank;
  d. fossil fuel burner;
  e. circulation device for using hot air from the compressor.

16. The method of claim 11, wherein the energy storage system comprises an indicator for measuring the energy consumption rate at said site to determine how much energy in storage should be released at any given moment in time to off-set the peak power spikes and/or surges that can occur at said site.

17. The method of claim 16, wherein the indicator is a consumption meter that can determine how much energy in storage should be released at any given moment in time.

18. The method of claim 11, wherein the method comprises forecasting how much energy will be used at said site during said second period of time, and determining how much compressed air energy will need to be stored in said tank to offset the energy used at said site, and to offset the peak power surges and/or spikes that are expected to occur at said site during said second period of time.

19. The method of claim 18, wherein the method comprises developing an energy usage schedule for the second period of time to determine how the energy from storage should be used during said second period of time.

20. The method of claim 19, wherein the method comprises determining the amount of the demand charge that may be applied during said second period of time, and developing the energy usage schedule to reduce and/or offset the peak power spikes and/or surges during said second period of time.

* * * * *